United States Patent
McRae

(10) Patent No.: US 9,719,851 B2
(45) Date of Patent: Aug. 1, 2017

(54) IR SENSOR EMBEDDED IN DIRECT LED BACKLIGHT AND LCD PANELS AND ASSEMBLIES FOR RECEIVING IR COMMAND CODES FROM A REMOTE

(71) Applicant: Vizio Inc, Irvine, CA (US)

(72) Inventor: Matthew Blake McRae, Irvine, CA (US)

(73) Assignee: Vizio Inc, Irvine, CA (US)

( * ) Notice: Subject to any disclaimer, the term of this patent is extended or adjusted under 35 U.S.C. 154(b) by 186 days.

(21) Appl. No.: 14/590,446

(22) Filed: Jan. 6, 2015

(65) Prior Publication Data
US 2016/0195428 A1    Jul. 7, 2016

(51) Int. Cl.
*G02F 1/1335* (2006.01)
*G01J 1/44* (2006.01)
*G02F 1/1368* (2006.01)
*G02B 5/20* (2006.01)
*H04N 5/44* (2011.01)
*H04N 5/64* (2006.01)

(52) U.S. Cl.
CPC .............. *G01J 1/44* (2013.01); *G02B 5/201* (2013.01); *G02B 5/208* (2013.01); *G02F 1/1368* (2013.01); *G02F 1/133514* (2013.01); *G02F 1/133528* (2013.01); *G02F 1/133603* (2013.01); *H04N 5/4403* (2013.01); *G01J 2001/4473* (2013.01); *H04N 5/64* (2013.01); *H04N 2005/4426* (2013.01)

(58) Field of Classification Search
CPC ................................. G02F 1/133528
See application file for complete search history.

(56) References Cited

U.S. PATENT DOCUMENTS

| | | | |
|---|---|---|---|
| 6,211,521 B1 | 4/2001 | Bawolek et al. | |
| 8,242,998 B2 | 8/2012 | Gui | |
| 8,350,827 B2 | 1/2013 | Chung et al. | |
| 8,451,214 B2 | 5/2013 | Lin et al. | |
| 8,451,241 B2 | 5/2013 | Kim et al. | |
| 8,466,902 B2 | 6/2013 | Boer et al. | |
| 2008/0111949 A1* | 5/2008 | Shibata | G02F 1/133603 349/64 |
| 2008/0121442 A1* | 5/2008 | Boer | G06F 3/0412 178/18.09 |

(Continued)

*Primary Examiner* — Phu Vu
(74) *Attorney, Agent, or Firm* — Law Office of Scott C Harris, Inc

(57) ABSTRACT

An infra-red assembly for a television, that has a plurality of layers operating for creating an image from pixels formed of illuminated color filters. The plurality of layers including a backlight, a polarization layer adjacent the backlight, a TFT layer over the polarization layer, an LCD layer overlying the TFT layer, and a color filter layer overlying the LCD layer. Wherein at least one of the layers includes an opening, and another of said layers includes an infrared filter that passes infrared and blocks light that is not infra red, and where another of said layers underlying said infrared layer includes an infrared receiver that receives the infrared through said opening and said infrared filter, and where said opening and said filter and said receiver are located in registration with one another, such that infrared passes through the opening and passes through the filter and passes to the receiver.

24 Claims, 9 Drawing Sheets

(56) References Cited

U.S. PATENT DOCUMENTS

| | | | |
|---|---|---|---|
| 2011/0299007 A1* | 12/2011 | Ra | G02F 1/13338 |
| | | | 349/58 |
| 2012/0001960 A1 | 1/2012 | Herz et al. | |
| 2014/0132578 A1* | 5/2014 | Zheng | G09G 5/10 |
| | | | 345/207 |

* cited by examiner

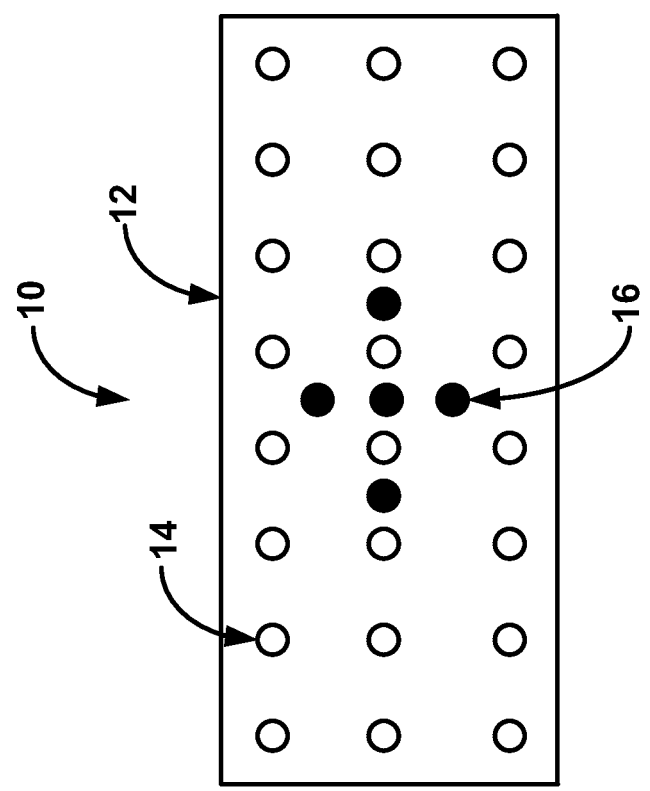

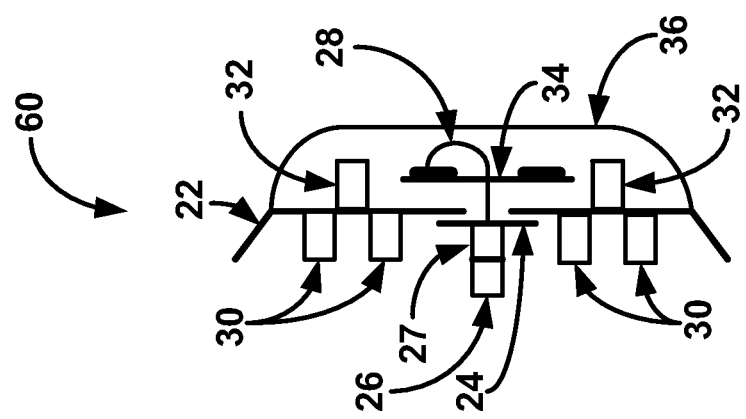

IR SENSOR EMBEDDED IN DIRECT LED BACKLIGHT AND LCD PANELS AND ASSEMBLIES FOR RECEIVING IR COMMAND CODES FROM A REMOTE

BACKGROUND

Televisions typically use infra-red ("IR") receivers for receiving commands from hand held remote control devices. A remote control is a component of an electronics device—most commonly a television set used for operating the television set wirelessly from a short line-of-sight distance. Remote controls issue commands from a distance to televisions and other devices. The remote control contains all the function controls for a television while the television itself will have only a limited handful of essential primary controls. The main technology used in home remote controls is infrared (IR) light. The signal between a remote control handset and the device it controls consists of pulses of infrared light which are invisible to the human eye.

The transmitter in the remote control handset sends out a stream of pulses of infrared light when the user presses a button on the handset. A transmitter is often a light emitting diode (LED) built into the pointing end of the remote control handset. The infrared light pulses form a pattern unique to that button. The receiver in the television recognizes the pattern and causes the television to respond accordingly.

Television remote control receivers are typically mounted behind a light filter that passes infrared light and blocks white or visible light. The actual IR receiver element is typically a phototransistor which receives filtered IR light emitted by the remote control.

Television styles and exterior designs have constantly been evolving over the years. With the event of large flat screen televisions, the available area on the front surface of a television has been diminishing. IR receiver assemblies previously were mounted directly behind the front bezel panel of televisions. As the bezels have become substantially thinner, IR Receiver assemblies have been moved off of the bezel and into the interior of the assemblies with light being carried from the front of the televisions to the IR receivers through light pipes or light guides. The assemblies have become expensive and the size of the light guides have, to some extent, dictated the minimum thickness of the front bezel.

SUMMARY

The inventor recognized a need for moving the light pipe or light guide to direct infrared light from the front of the television to where the IR receiver is located.

An embodiment describes relocating the IR receiver assembly to the interior of the backlight assembly or to the interior of a backlight/light bar assembly and/or to the TFT layer of the LCD panel assembly environment.

In a preferred embodiment, an IR receiver assembly is placed within the direct LED or LED edge lit backlight assembly, within a combination backlight/light bar assembly, or integrated into the TFT layer residing under the LCD sub pixels with the IR receiver being a TFT photosensitive transistor with a IR filter residing on the color filter layer.

BRIEF DESCRIPTION OF THE DRAWINGS in the drawings:

FIG. 1 is a depiction of a backlight assembly containing 24 LEDs and 5 IR receiver devices.

FIG. 3 is a depiction of the invention mounted in a direct LED backlight with a light bar attached to the backlight assembly.

DETAILED DESCRIPTION

Figure 2B:
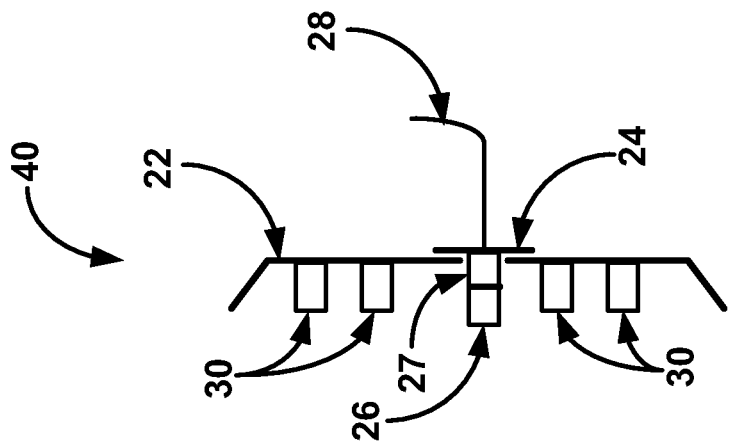
FIG. 2B is a depiction of one embodiment of the invention where an IR receiver device is mounted on a PCB that is fixed to the back side of the back light assembly.

Reference will now be made in detail to various embodiments, examples of which are illustrated in the accompanying drawings. Wherever possible, the same reference numbers will be used throughout the drawings to refer to the same or like parts.

There are several differently configured IR receiver modules used in televisions. They range from a phototransistor mounted on a PCB and connected to the main television logic PCB with three wires. The main logic PCB will generally interface with the IR phototransistor PCB that also contains an amplifier and in some cases digital logic to decode the IR pulse train.

Another configuration places the phototransistor on a PCB mounted on the back side of the bezel behind an IR filter. These PCBs will typically be connected with 5 to 6 wire cable harnesses to the main PCB of the television.

In a preferred embodiment, the IR receiver module (comprising a PCB, phototransistor with an IR filter cap covering the transistor junction, and an amplifier) is mounted on the reflective surface of a direct LED backlight assembly. A hole through the backlight assembly back surface allows cable access between the IR receiver module and the main logic PCB. In this embodiment, several IR receiver modules are mounted to the reflective surface of the backlight assembly to increase the amount of infrared light that is captured to make up for the light lost while passing through the LCD panel layers depicted in prior art FIGS. 4 and 5.

In a related embodiment, the PCB with the phototransistor mounted on the backside of the LED direct backlight assembly with the IR filter cap of the phototransistor sticking through a hole on the backlight assembly.

In a related embodiment, the PCB with the phototransistor mounted on the backside of the LED direct backlight assembly will be connected via a cable harness to the main logic PCB for the television where the signal from the phototransistor is amplified and decoded.

In another preferred embodiment, the phototransistor is implemented as a thin film transistor (TFT) phototransistor on the TFT layer of the LCD panel which is on the back side of the LCD layer. The color filter layer which is on the light emitting side of the LCD layer has an IR filter that resides directly over the IR phototransistor TFT. The phototransistor TFT is placed between columns of pixel groups with a window in the mask to allow IR light to pass through the mask to the IR phototransistor TFT.

In another preferred embodiment, the IR receiver assembly is placed near the bottom corner of the back surface of the LCD panel. In this embodiment, the fixture that holds the LCD panel assembly together leaves a space between it and the bottom pixels of the LCD panel. An IR window is created in the polarization film/sheets resident on the front surface of the LCD panel assembly and the back surface of the LCD panel assembly. An IR filter is placed on the color filter layer such that it will line up with the IR windows placed on the front and back polarization films. Another IR window is placed on the LCD panel as a void in the mask of the layer. Another RF window is placed as a void on the TFT layer such that it will line up with the IR windows placed on the front and back polarization films. IR light directed from a remote control device will pass through the IR windows and IR filter and impact on the IR receiver placed on the back surface of the LCD panel assembly lined up with the IR windows.

Now referencing FIG. 1 where 10 depicts a simple direct LED backlight assembly. In this depiction, the array of LEDs is represented by white circular objects 14. One embodiment of the invention is shown here with five IR receivers 16. Multiple IR receivers are depicted as one means to overcome the diminished level of light that will reach the IR receivers due to the IR light passing through the LCD panel and diffusor. While this shows five receivers, it should be understood that any number of receivers could be placed in any geometric configuration.

Figure 2A:
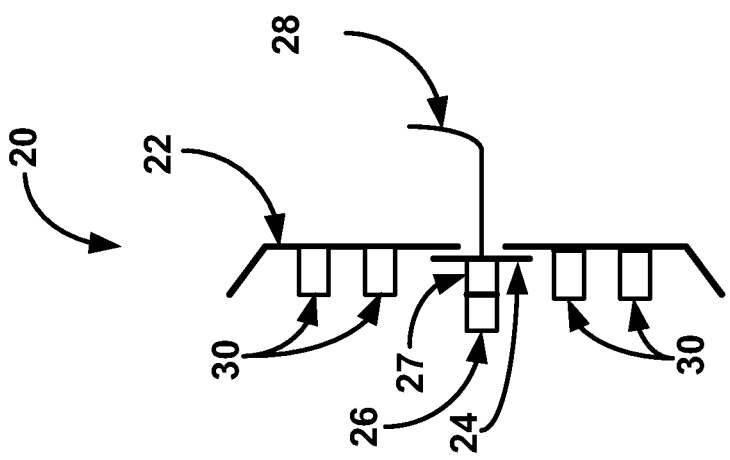
FIG. 2A is a depiction of one embodiment of the invention where an IR receiver device is mounted on a PCB that is fixed to the front or light emitting side of the back light assembly.

Now referencing FIG. 2A where 20 depicts a side view of a direct LED backlight assembly. In this depiction, 22 is the backlight and reflector component of the backlight assembly. White light LEDs 30 emit white light forward through the LCD panel assembly. IR receiver is typically a phototransistor 27 with IR filter cap 26 that only allows infrared light to enter the junction area of phototransistor 27. In this depiction, IR phototransistor 27 is mounted to PCB 24 which in turn is mounted or fixed to the front surface of backlight and reflector 22. This depiction also shows cable assembly 28 which is a multi-wire cable that provides power to phototransistor 27 and at least one return wire carrying the binary bit patterns sent by an IR remote control device. Cable assembly 28 connects to the main logic PCB for the television.

Now referencing FIG. 2B where 40 depicts a side view of a direct LED backlight assembly. In this depiction 22 is the backlight and reflector component of the backlight assembly. White light LEDs 30 emit white light forward through the LCD panel assembly. IR receiver is typically a phototransistor 27 with IR filter cap 26 that only allows infrared light to enter the junction area of phototransistor 27. In this depiction, IR phototransistor 27 is mounted to PCB 24 which in turn is mounted or fixed to the back surface of backlight and reflector 22 with phototransistor 27 with IR filter 26 sticking through a hole in backlight and reflector 22. This depiction also shows cable assembly 28 which is a multi-wire cable that provides power to phototransistor 27 and at least one return wire carrying the binary bit patterns sent by an IR remote control device. Cable 28 connects to the main logic PCB for the television.

By affixing the PCB 24 to the rear surface of the assembly 22, the distal end of the IR filter extends less far outward than in the FIG. 2A embodiment.

Now referencing FIG. 3 where 60 depicts a direct LED backlight assembly 22 with light bar assembly 36 attached. In this depiction, light bar assembly 36 is translucent so that light emitted from LEDs 32 provide back lighting against a wall to reduce the contrast between the display screen of a television and the environment in a darkened room. In this depiction, forward facing LEDs 30 emit light toward the LCD panel. IR phototransistor 27 with IR filter cap 26 is mounted on PCB 24 which in turn is mounted to the front face of LED backlight assembly 22. A hole in backlight assembly 22 allows cable harness 28 to pass through backlight assembly 22 to main logic PCB 34 and to connect to main logic PCB 34.

Figure 4:
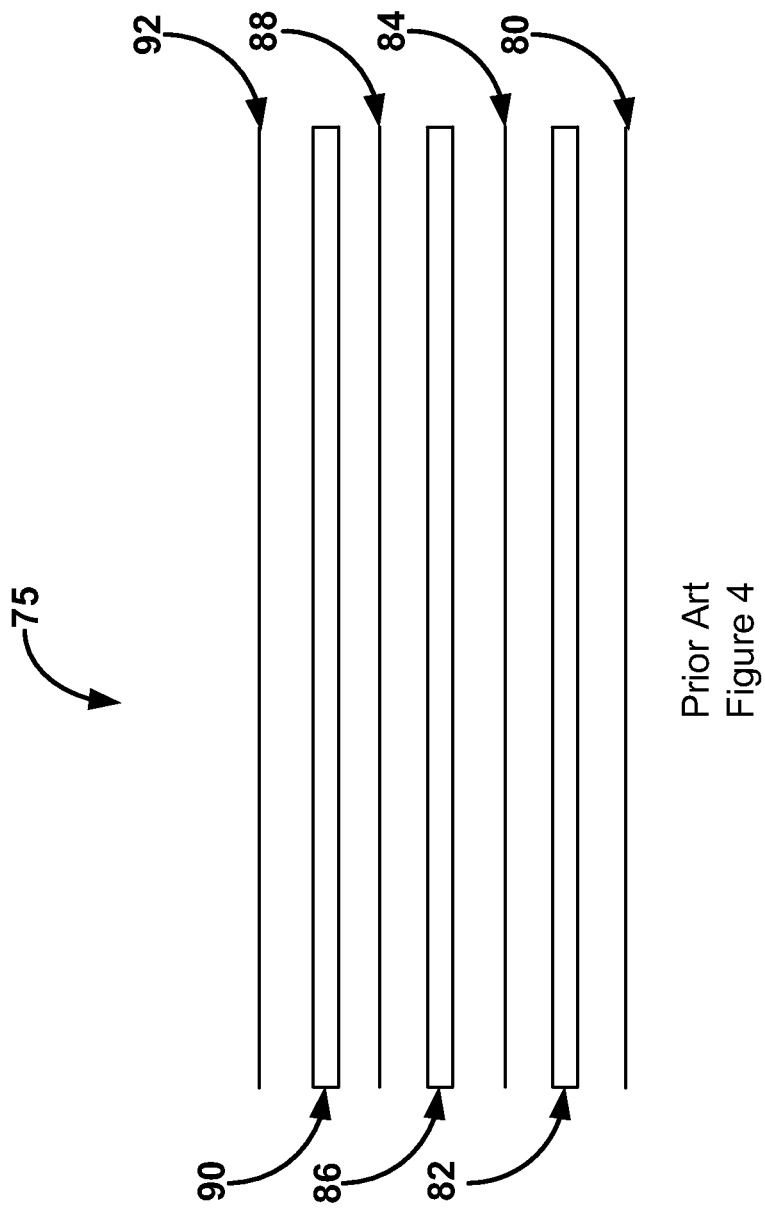
FIG. 4 is a prior art example showing an edge view of the layers of material that make up a LCD panel.

Now referencing prior art FIG. 4 where 75 depicts a typical LCD panel assembly. LCD panels are made up of multiple layers starting with a polarization film/sheet 80 on the back exterior surface of lower glass layer 82 which has thin film transistor (TFT) components laid out on the top surface of lower glass layer 82 making up TFT layer 84. LCD gates layer 86 rests on TFT layer 84 and lower glass layer 82. The LCD gates are positioned such that each LCD gate resides directly above its controlling TFT circuit. A color filter layer 88 rests directly on top of LCD gates layer 86. Color filters in each of the primary colors (Red, Blue, and Green) reside directly over each given LCD gate. Typically these color filter elements are arranged in columns with each column being red, blue, or green. Three adjacent LCD gates or sub-pixels will represent one pixel. An upper glass layer rests directly on color filter layer 88. Upper glass layer 90 has polarizer film/sheet 92 on the top surface to improve the direction of light passing out of lower glass layer 82 and upper glass layer 90.

Figure 5:
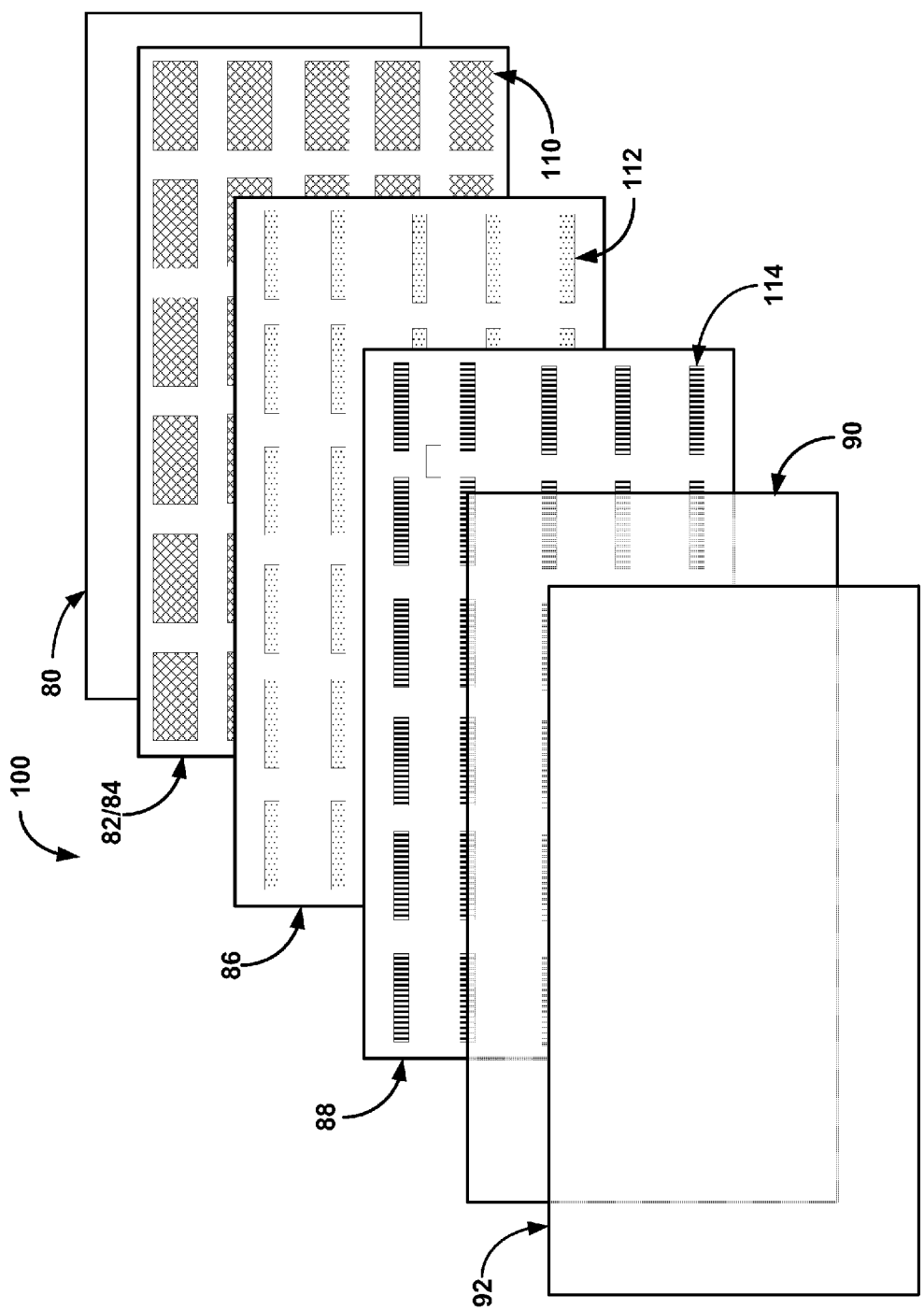
FIG. 5 is a prior art example showing the surfaces of the layers of material that make up a LCD panel.

Now referencing prior art FIG. 5 where 100 depicts the surfaces of each layer of LCD panel 100. In this depiction, polarization film/sheet 80 is positioned on the back side of lower glass layer 82 and TFT layer 84 are shown with hashed boxes 110 depicting the TFT logic circuits that control LCD gates 112 on LCD gates layer 86. Light entering lower glass layer 82 passes through TFT layer 84 and through LCD gates 112 that are untwisted as a result of TFT logic circuits applying a voltage to LCD gates 112. Light that passes through one or more LCD gates 112 will then pass through color filters 114 then pass through upper glass layer 90 and polarization film/sheet 92 then out toward the viewer.

Figure 6:
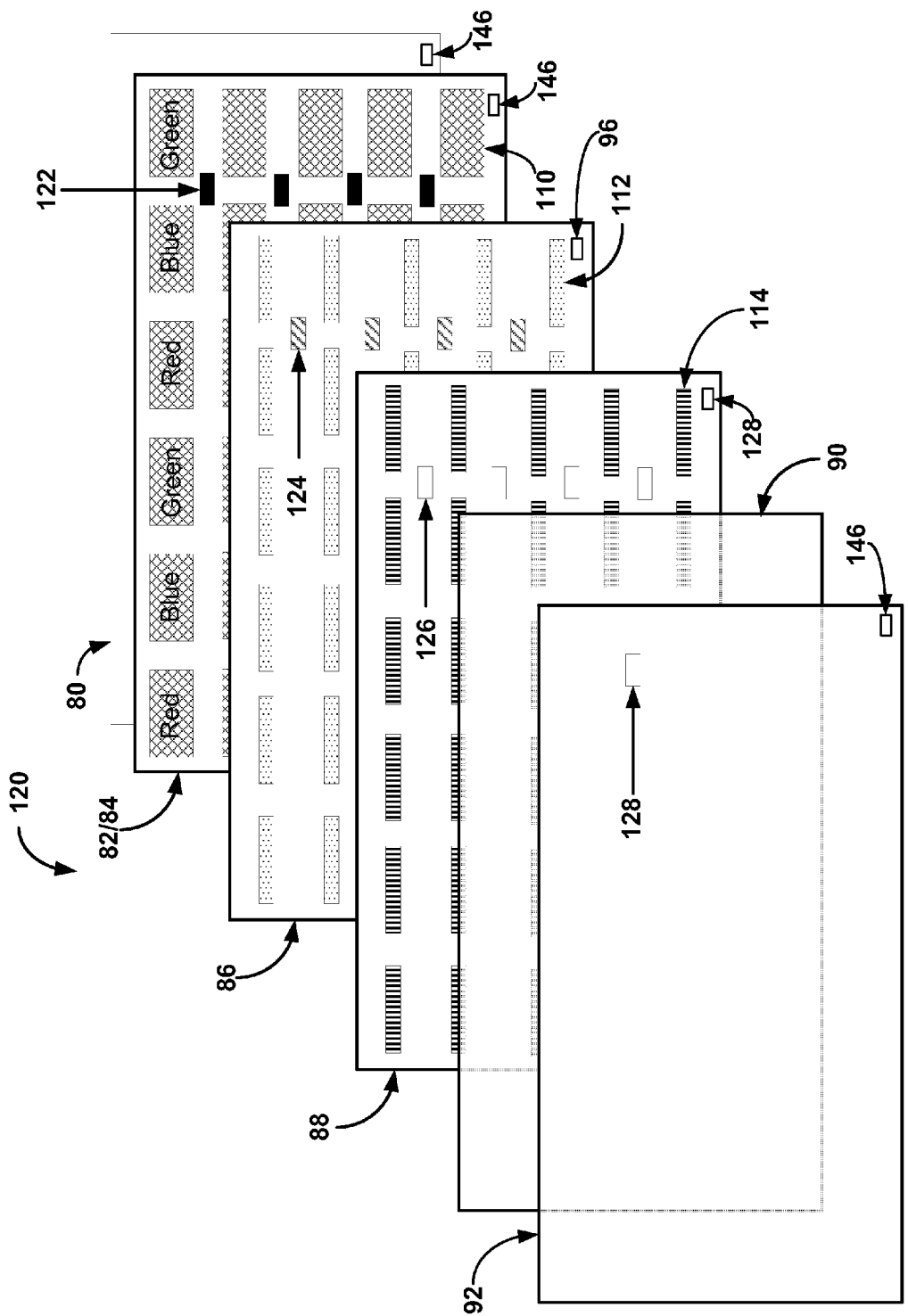
FIG. 6 is a depiction of the invention as it would appear when the invention is made up of a TFT transistor residing on the TFT layer of a LCD panel.

Now referencing FIG. 6 where 120 depicts two embodiments. In one embodiment of the invention, IR receiver 122 is a thin film transistor with its junction exposed toward the front of LCD panel 120. Note that for the sake of clarity, only one of 4 IR receiver TFT devices are labeled. In this depiction, a window 124 is depicted on LCD gates layer 86. Window 124 is a void in the mask of LCD gates layer 86. The purpose of the window is to facilitate the passage of light through the LCD gates layer. An IR filter 126 is depicted on color filter layer 88. IR filter 126 blocks any extraneous light that may enter the LCD panel assembly 100 from the front of the display screen. This IR filter is advantageously located on the layer that already has wavelength (here color) filters.

The other layers, such as polarization layer 92, are formed with a window that allows the IR to pass.

In operation, IR light emitted by an IR remote control will enter the LCD panel assembly passing through polarization film/sheet 92 at IR window 128 and through upper glass layer 90, through IR filter 126 residing on color filter layer 86, through window 124 residing in LCD gates layer 86 and illuminates IR receiver 122 residing on TFT layer 84. As IR light illuminates IR receiver 122, TFT signal lines conduct the electrical signal containing the binary bit pattern from IR receiver 122 to control logic.

In another preferred embodiment, IR window 146 placed in polarization film/sheet 92, IR filter 128 is placed on filter layer 88, IR window 96 is a void in the mask of LCD gates later 86, and IR windows 146 are placed on TFT layer 84 and polarization film/sheet 80. All of the IR windows and IR filter 128 are in line. IR receiver 162 is mounted to the back of polarization film/sheet 80 in the LED backlight, in any of the ways explained with respect to previous embodiments. These two embodiments present the least amount of materials that IR light from a remote control device has to pass through to illuminate IR receiver 162. In one embodiment,—the receiver or phototransistor is mounted to the back of polarization film/sheet 80 in with the LED backlight.

Note that multiple ones of these embodiments can be combined together, so that the openings and receivers can be configured.

Figure 7:
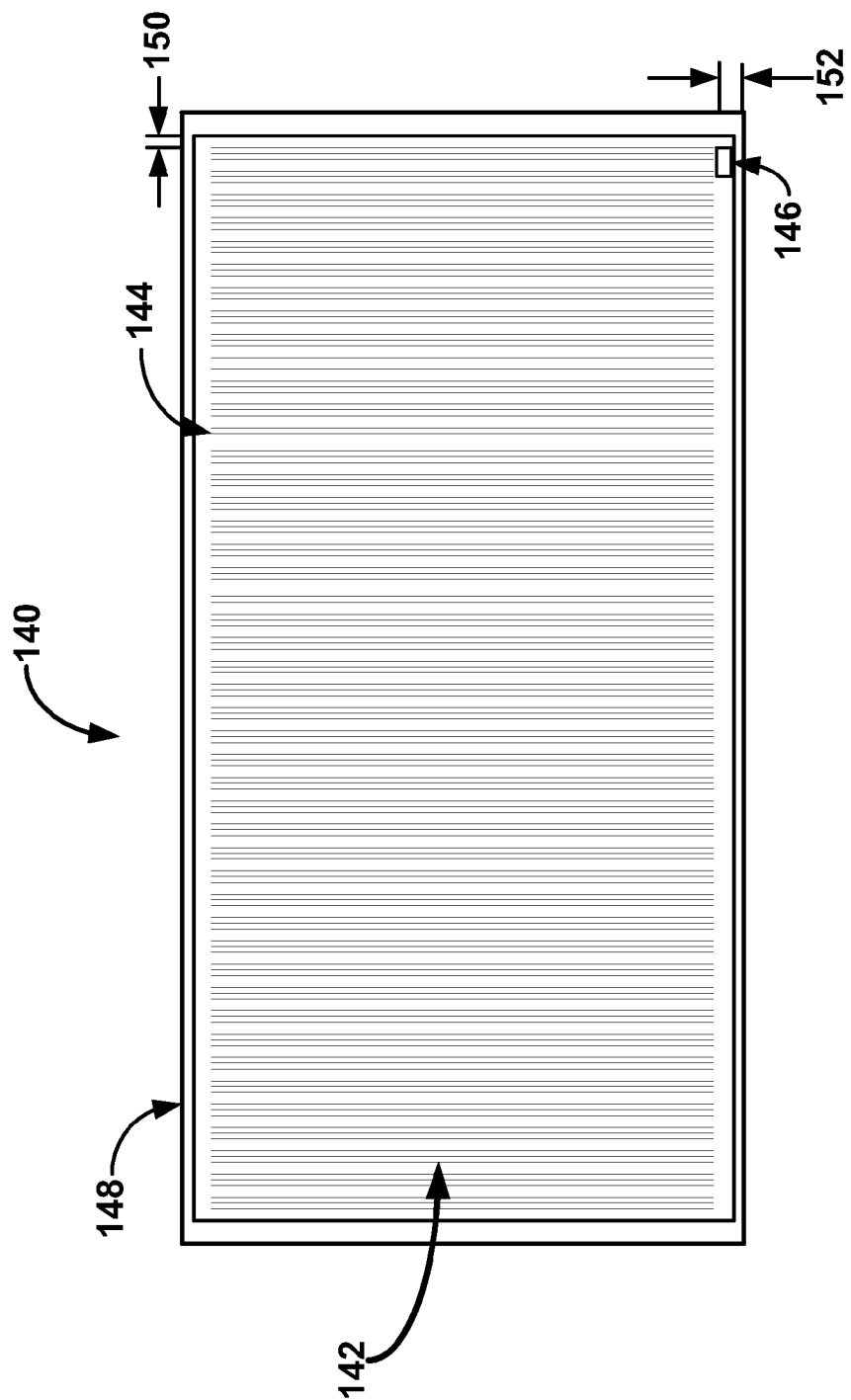
FIG. 7 is a depiction of one embodiment of the invention where a IR receiver is located on the back side of a LCD panel assembly and a IR window is depicted on the front face of the LCD panel assembly in the polarizer film.

Now referencing FIG. 7 where 140 depicts one embodiment of the invention. In this depiction, LCD panel 142 assembly is held together by structure 148 which encases the edges of the assembly. Pixel columns 144 are positioned such that there exists a border between each front interior edge of structure 148 and the two outside edges of pixel columns 144 and the tops and bottoms of pixel columns 144. IR window 146 passes IR light through the panel assembly to IR receiver 162-mounted to the back of polarization film/sheet 80. The space between the bottom interior edge of structure 148 and the bottom edge of pixel columns 144 is distance 152. This space is approximately 10 to 15 pixels in height in this embodiment. The space between the side interior edges of structure 148 and the outer edges of pixel columns 144 is distance 150. This space is approximately 5 to 8 pixels in height. This space is provided for structural integrity and in areas where the pixels might not be difficult to configure.

Figure 8:
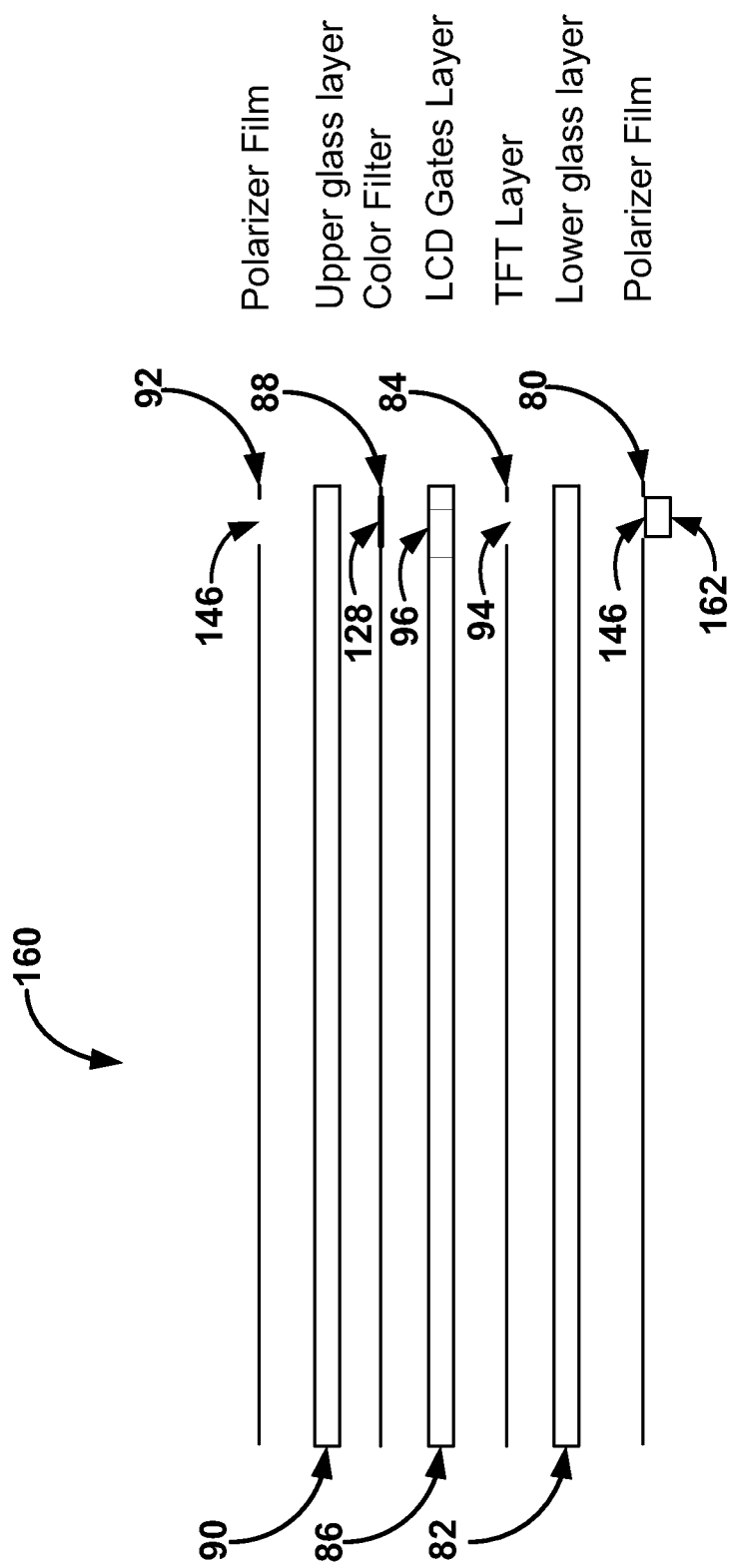
FIG. 8 is a depiction of one embodiment of the invention showing an edge view of the layers making up the LCD panel assembly and placement of the IR receiver.

Now referencing FIG. 8 where 160 depicts an edge view of an LCD panel where panel components polarization film/sheet 80 resides against the back surface of lower glass layer 82. TFT layer 84 resides on the top surface of lower glass layer 82. LCD gates layer 86 resides against TFT 84. Color filter layer 88 resides against the upper surface of LCD gates layer 86. Upper glass layer 90 resides against color filter layer 88 and polarizer film/sheet 92 resides against the upper surface of upper glass layer 90. In this depiction, two IR windows 94 are opened in polarization film/sheet 92 and 80. In this depiction, IR windows 146 are placed in upper and lower polarization film/sheets 80 and 92. IR receiver 162 is fixed/mounted to the exterior side of lower polarization file/sheet 80. TFT layer 84 has a void 94 in the mask that allows IR light to pass through with minimal attenuation. LCD gates layer 86 has a void 96 in the mask that also allows IR light to pass through with minimal attenuation. Color filter layer 88 has an IR filter 128 on the surface of color filter layer 88 placed in line with the RF windows 146 above and 96 below to filter white light out of the IR beam. This depiction has a very low loss of IR light passing through the LCD panel assembly to IR receiver 162.

Figure 9:
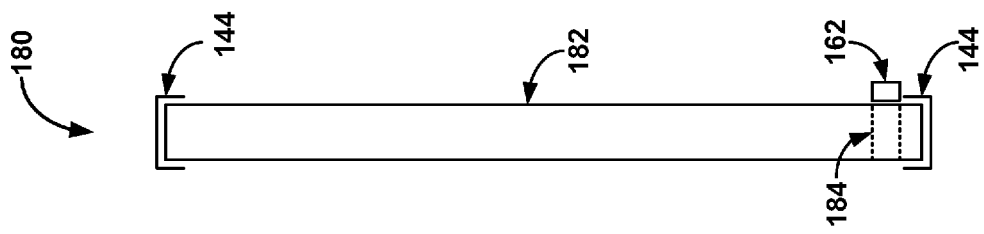
FIG. 9 is a depiction of one embodiment of the invention showing an edge view of an assembled LCD panel with the fixture that holds the panel together and the placement of the IR receiver.

Now referencing FIG. 9 where 180 is a depiction of an edge view of LCD panel assembly 182 is held together with structure 144. IR window 184 provides a low loss path through LCD panel 182 to IR receiver 162 mounted on the back surface of LCD panel 182.

The general structure and techniques, and more specific embodiments which can be used to effect different ways of carrying out the more general goals are described herein.

Although only a few embodiments have been disclosed in detail above, other embodiments are possible and the inventor(s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other media types and other media players can be used. Other kinds of communication and sensors can be used beyond infra red. Also the openings and filters can be located in different locations besides those shown. The openings can be replaced by lenses or other optical structures.

Note also that the above has described operation with a digital television. However, more generally, this can be used on any kind of device that displays videos, such as television sets, Set top boxes, Game consoles, Tuner dongles, Personal computers, and any other device having the ability to display AV content.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be controlled by a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard wired network cable such as Ethernet or may be a wireless connection such as a RF link running under a wireless protocol such as 802.11. Likewise, external bus 18 may be any of but not limited to hard wired external busses such as IEEE-1394 or USB. The computer system can also have a user interface port that communicates with a user interface, and which receives commands entered by a user, and a video output that produces its output via any kind of video output format, e.g., VGA, DVI, HDMI, displayport, or any other form. This may include laptop or desktop computers, and may also include portable computers, including cell phones, tablets such as the IPAD™ and Android platform tablet, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An assembly for a television, comprising:
a plurality of layers which are energized for creating an image from pixels formed in said layers,
said plurality of layers including:
a backlight layer,
a switching layer, overlying said backlight layer, said switching layer having individual elements arranged in a matrix, said individual elements that form said pixels and where said individual elements are modulated to create the image;
a color filter layer overlying the switching layer, said color filter layer including individual color filter elements arranged in a matrix;

and at least one polarization layer overlying the color filter layer, at least a first infrared receiver located on one of said layers which underlies said color filter layer, said first infrared receiver being located in a location that is between said individual elements formed in a matrix, at least a second infrared receiver located on said one of said layers which underlies said color filter layer, said second infrared receiver being in an area that is between said individual elements formed in a matrix, and in a different location than said first infrared receiver, a first opening in said color filter layer, in registration with said first infrared receiver, and in registration with the area between individual elements of said color filter layer, located so that IR received in said first opening passes to said first infrared receiver, said first opening having an infrared filter that only passes infrared, a second opening in said color filter layer, in registration with said second infrared receiver, and in registration with the area between individual elements of said color filter layer, located so that IR received in said second opening passes to said second infrared receiver, said second opening having an infrared filter that only passes infrared, and a third opening in said at least one polarization layer, in registration with said first infrared receiver, located in a location such that infrared passing through said third opening is passed to said first opening, and to said first infrared receiver; and a fourth opening, in said at least one polarization layer, in registration with said second infrared receiver, located in a location such that infrared passing through said fourth opening is passed to said second opening, and to said second infrared receiver.

2. The assembly as in claim 1, wherein there are openings in all of the switching layer, the color filter layer, and the polarization layer, and said infrared receiver is located in the backlight layer.

3. The assembly as in claim 1, wherein said switching layer comprises a thin-film transistor layer with individual thin film transistors, and a liquid crystal layer with individual liquid crystals, and said infrared receiver is located in a location in between said individual elements.

4. The assembly as in claim 2, wherein the back light is a direct LED backlight layer.

5. The assembly as in claim 4, further comprising a hole in the back light layer through which a cable is run.

6. The assembly as in claim 1, wherein said infrared filter is located on the color filter layer.

7. The assembly as in claim 1, wherein the infrared receivers are located in between four different individual elements.

8. The assembly as in claim 1, wherein there are multiple polarization layers, and the openings are located in each of the polarization layers.

9. The assembly as in claim 1, wherein there is an outer edge of the area that has no pixels thereon, and wherein said openings, said filter, and said receiver are located in said outer edge.

10. An infra-red assembly for a television, comprising:

a plurality of layers operating for creating an image from pixels formed of illuminated color filters, said plurality of layers including a backlight, a polarization layer adjacent the backlight, a TFT layer over the polarization layer, an LCD layer overlying the TFT layer, and a color filter layer overlying the LCD layer, each of said TFT layer, said LCD layer, and said color filter layer including individual elements thereon, with an area between said individual elements and wherein at least said polarization layer multiple openings which pass infrared, said openings being at locations that are in registration with areas in between said individual elements, and where another of said layers, that underlies said polarization layer, includes multiple areas which include infrared filters that pass infrared and block light that is not infra red, said multiple areas being at locations that are in registration with areas that are between multiple individual elements, and where another of said layers underlying said infrared filter includes multiple different infrared receivers that receives the infrared through said opening and said infrared filter, and where said opening and said filter and said receiver are located in registration with one another, such that infrared passes through the opening and passes through the filter and passes to the receiver and where said multiple different infrared receivers are located in between said multiple individual elements.

11. The assembly as in claim 10, wherein said infrared receiver is located in the backlight.

12. The assembly as in claim 11, wherein said backlight is located on an outer edge of the layers.

13. The assembly as in claim 11, wherein the backlight is a direct LED backlight layer.

14. The assembly as in claim 13, further comprising a hole in the back light layer through which a cable is run.

15. The assembly as in claim 10, wherein said infrared filter is located on the color filter layer.

16. The assembly as in claim 10, wherein the opening is located in the polarization layer.

17. The assembly as in claim 10, wherein there is an outer edge of the area that has no pixels thereon, and wherein said openings, said filter, and said receiver are located in said outer edge.

18. A method of receiving infra-red in a television, comprising:

creating an image from pixels formed from a plurality of stacked controllable layers that are illuminated by a backlight;

said plurality of layers including a backlight layer, a polarization layer adjacent the backlight, a TFT layer over the polarization layer, an LCD layer overlying the TFT layer, and a color filter layer overlying the LCD layer, each of said TFT layer, said LCD layer, and said color filter layer including individual elements thereon, with an area between said individual elements, and wherein at least said polarization layer multiple openings which pass infrared, said openings being at locations that are in registration with areas in between said individual elements, and where another of said layers, that underlies said polarization layer, includes multiple areas which include infrared filters that pass infrared and block light that is not infra red, said multiple areas being at locations that are in registration with areas that are between multiple individual elements and where another of said layers underlying said infrared filter includes multiple different infrared receivers that receives the infrared through said opening and said infrared filter, and where said opening and said filter and said receiver are located in registration with one another, such that infrared passes through the opening and passes through the filter and passes to the receiver and where said multiple different infrared receivers are located in between said multiple individual elements.

19. The method as in claim 18, wherein said infrared receiver is located in the backlight.

20. The method as in claim 18, wherein said creating the image comprises backlighting from an outer edge of the layers.

21. The method as in claim 18, wherein said creating the image comprises backlighting from the whole of the layers.

22. The method as in claim 18, wherein said infrared filter is located on the color filter layer.

23. The method as in claim 18, wherein the opening is located in the polarization layer.

24. The method as in claim 18, wherein there is an outer edge of the area that has no pixels thereon, and wherein said openings, said filter, and said receiver are located in said outer edge.

* * * * *